United States Patent [19]

Itoh

[11] Patent Number: 5,155,587
[45] Date of Patent: Oct. 13, 1992

[54] COLOR CONVERSION METHOD FOR REPRODUCING AN IMAGE AND AN IMAGE REPRODUCING DEVICE INCORPORATING THE SAME

[75] Inventor: Takanori Itoh, Yokohama, Japan
[73] Assignee: Ricoh Company, Ltd., Tokyo, Japan
[21] Appl. No.: 525,048
[22] Filed: May 18, 1990

[30] Foreign Application Priority Data

| | | | |
|---|---|---|---|
| May 18, 1989 | [JP] | Japan | 1-125344 |
| May 18, 1989 | [JP] | Japan | 1-125345 |
| Feb. 27, 1990 | [JP] | Japan | 2-46753 |

[51] Int. Cl.$^5$ .................................................. G03F 3/08
[52] U.S. Cl. ......................................... 358/79; 358/80
[58] Field of Search ................................. 358/79, 80

[56] References Cited

U.S. PATENT DOCUMENTS

| | | | |
|---|---|---|---|
| 4,679,074 | 7/1987 | Sugiura et al. | 358/80 |
| 4,683,492 | 7/1987 | Sugiura et al. | 358/79 |
| 4,887,150 | 12/1989 | Chiba et al. | 358/80 |
| 4,908,712 | 3/1990 | Uchiyama et al. | 358/80 |
| 4,985,759 | 1/1991 | Ito | 358/79 |

Primary Examiner—David K. Moore
Assistant Examiner—Barry Stellrecht
Attorney, Agent, or Firm—Oblon, Spivak, McClelland, Maier & Neustadt

[57] ABSTRACT

A color information converting device for use in a color image recorder for processing image density signals each being representative of a particular color-separated image density to produce a record density signal representative of the record density of black, cyan, magenta or yellow. The device adds an undercolor to an image easily with a simple and inexpensive construction and produces a record density signal representative of full black or skeleton black also easily with a simple and inexpensive construction. In a full-color record mode, image density signals are transformed into record density signals by constants which are associated with the values of the image density signals while, in a monocolor record mode, the former is transformed into the latter by constants which are not related to the values of the image density signals. This implements combined full-color and monocolor recording which is excellent in color-reproducibility.

7 Claims, 13 Drawing Sheets

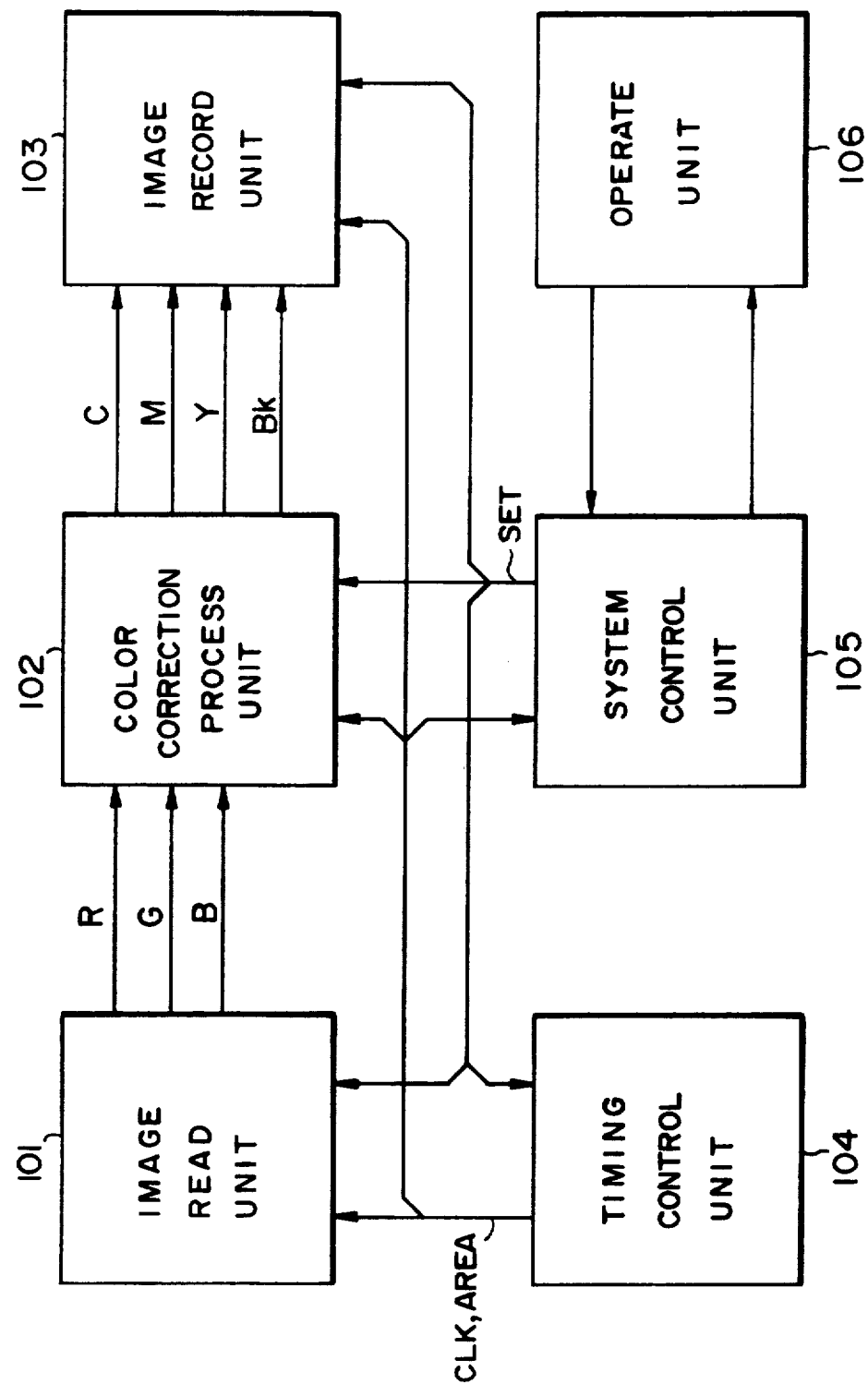

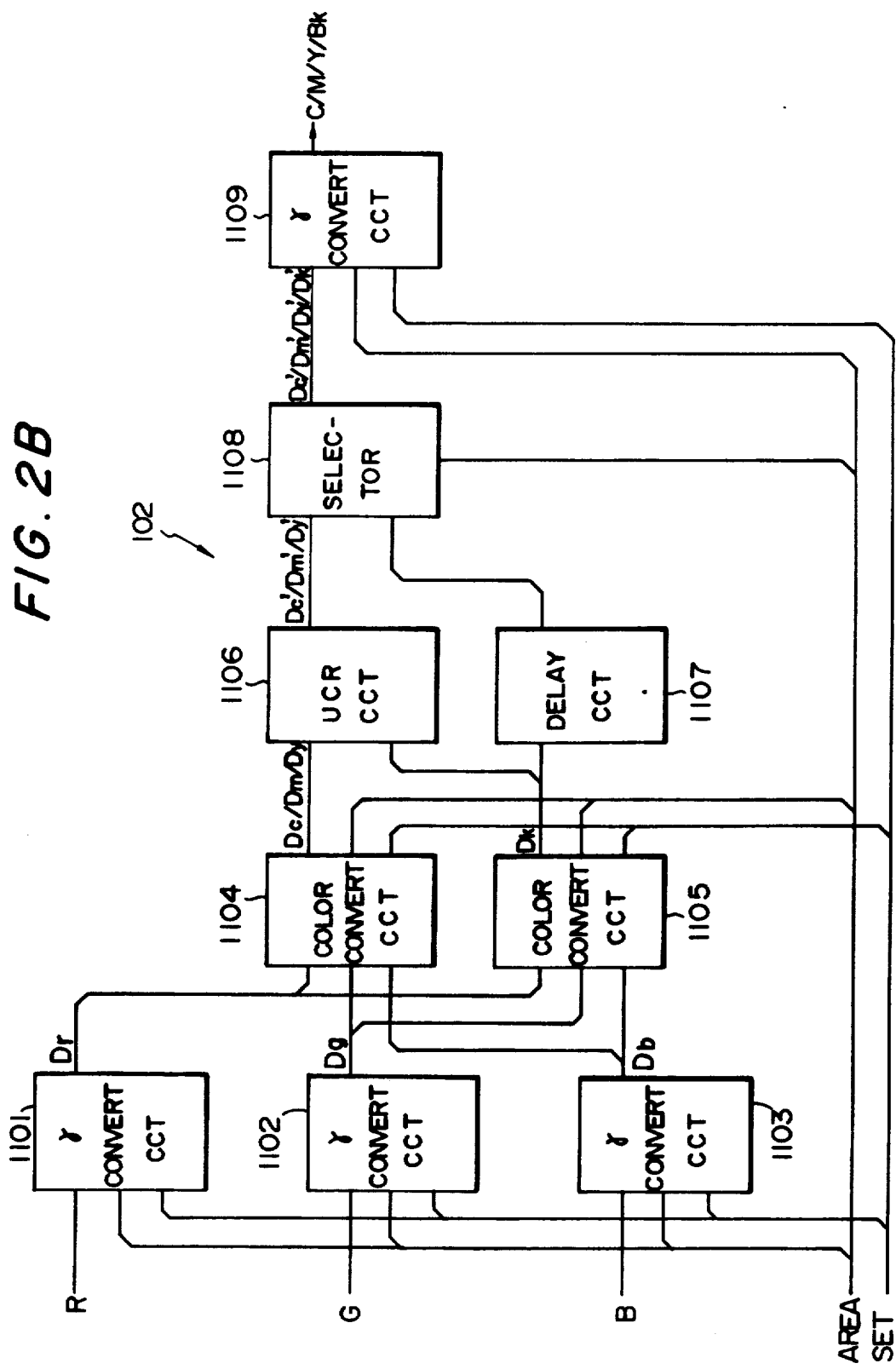

FIG. 11A

| ADDRESS | CONSTANT MEMORY CCT 302 OF COLOR CONVERT CCT 204 | | |
|---|---|---|---|
| 0 | 16F (1.434) | Dr<Dg<Db | |
| 1 | 1DB (1.856) | Dg≦Dr<Db | |
| 2 | 1B4 (1.704) | Dg<Db≦Dr | CONSTANTS FOR FULL COLOR |
| 3 | 1B4 (1.704) | Db≦Dg≦Dr | |
| 4 | 19F (1.622) | Db≦Dr<Dg | |
| 5 | 16F (1.434) | Dr<Db≦Dg | |
| 6 | 04C (0.300) | | CONSTANTS FOR MONO COLOR |
| 7 | 000 (0.000) | UNUSED | |

FIG. 11B

| ADDRESS | CONSTANT MEMORY CCT 313 OF COLOR CONVERT CCT 206 | |
|---|---|---|
| 0 | 000 (0.000) | CONSTANTS FOR FULL COLOR |
| 1 | 000 (0.000) | UNUSED — CONSTANTS FOR MONO COLOR |
| 2 | 000 (0.000) | |
| 3 | 055 (0.500) | |
| 4 | 000 (0.000) | UNUSED |
| 5 | 000 (0.000) | UNUSED — CONSTANTS FOR UNDER COLOR |
| 6 | 000 (0.000) | UNUSED |
| 7 | 000 (0.000) | UNUSED |

COLOR CONVERSION METHOD FOR REPRODUCING AN IMAGE AND AN IMAGE REPRODUCING DEVICE INCORPORATING THE SAME

BACKGROUND OF THE INVENTION

The present invention relates to a color information converting device for use in a color image recorder for processing image density signals each being representative of a particular color-separated image density to produce a record density signal representative of the record density of black, cyan, magenta or yellow.

With a color copier or similar color image recorder, it is a common practice to read spectral density data of red (R), green (G), blue (B) and so forth by a color scanner and then convert them into record density data of cyan (C), magenta (M), yellow (Y), black (Bk) and so forth by a color printer. Various methods and apparatuses have heretofore been proposed for implementing such conversion (e.g. Japanese Patent Laid-Open Publication Nos. 125054/1988, 246979/1988, 116277/1988, 161979/1984 and 13260/1986 and Japanese Patent Application Nos. 135833/1988 and 193695/1988). Among them, Laid-Open Publication No. 125054/1988 discloses a color conversion circuit which switches over constants by using signals which are not related to the values of image density signals. Laid-Open Publication No. 246979/1988 teaches a color converting device having an exclusive conversion circuit for full color, an exclusive conversion circuit for monocolor, and a circuit for selecting one of the outputs of the two conversion circuits. Further, Laid-Open Publication No. 135833/1988 proposes a color conversion circuit of the type generating a constant selecting signal which selects constants each being associated with a particular image density signal in matching relation to the values of the image density signals.

Laid-Open Publication No. 161979/1984 mentioned above discloses a device having a plurality of look-up tables (LUT) and a gamma conversion circuit for switching over the LUTs. In this type of device, an exclusive LUT for undercolors is provided to readily implement the addition of an undercolor. Such a scheme, however, needs an extra memory capacity for accommodating undercolors, resulting in an increase in cost.

Laid-Open Publication No. 116277/1988 also mentioned previously proposes a color converting method which executes so-called masking processing on the record density of only a single coloring material by using an equation:

$$Dx = Kxr \cdot Dr + Kxg \cdot Dg + Kxb \cdot Db$$

where Kxr, Kxg and Kxb are constants, and x is c, m, y or k.

The approach using the above equation, however, has a drawback that it cannot add an undercolor to an image.

Laid-Open Publication No. 13260/1986 shows a method which selects the minimum values of image density signals (Dr, Dg and Db) representative of color-separated image densities and determines a record density of black by using a gamma conversion circuit. A problem with this method is that since unnecessary components contained in cyan, magenta and yellow coloring materials have to be taken into account, an image cannot be recorded in full black. While gamma conversion processing is usually implemented with an LUT, the recording amount pattern of black cannot be varied unless a plurality of LUTs are used, resulting in a complicated circuit arrangement.

Laid-Open Application Nos. 135833/1988 and 193695/1988 each discloses a method which, in the event of recording an image by using a black coloring material also, begins to output black from zero gray scale density. Hence, tones rendered slightly differ from orginal tones.

A color conversion circuit proposed by Laid-Open Publication No. 125054/1988 cannot select constants in matching relation to image density signals and, therefore, cannot correct the failure of the density addition rule. Hence, it is impossible to attain sufficient color reproducibility in the event of color reproduction.

A color converting device disclosed in Laid-Open Publication No. 246979/1988 needs exclusive color conversion circuits for full color and monocolor and, therefore, it is complicated and expensive.

Laid-Open Application No. 135833/1988 teaches a color converting circuit constructed to select constants in association with the values of image density signals and, therefore, capable of correcting the failure of the density addition rule. However, since this kind of approach needs constants associated with image density signals even in a monocolor mode, product sum processing means corresponding to a greater number of constants has to be used to implement combined full-color and monocolor recording. Such circuitry cannot be realized at low cost.

SUMMARY OF THE INVENTION

It is therefore an object of the present invention to provide a color information converting device capable of adding an undercolor to an image.

It is another object of the present invention to provide a color converting device capable of converting color information into full black or skeleton black, as desired.

It is another object of the present invention to provide a color information converting device capable of correcting the failure of the density addition rule in the event of full-color recording and executing combined full-color and monocolor recording.

It is another object of the present invention to provide a generally improved color information converting device.

In accordance with the present invention, color information converting device for processing image density signals each being representative of a particular color-separated image density to produce a record density signal representative of a record density of black, cyan, magenta or yellow comprises multipliers for multiplying the individual image density signals by a predetermined first group of constants each being associated with respective one of the image density signals, constant signal generating circuits for generating signals representative of a second group of constants, and adders for adding signals outputted by the multipliers and signals outputted by the constant signal generating circuits.

Also, in accordance with the present invention, a color information converting device for processing image density signals each being representative of a particular color-separated image density to produce a record density signal representative of a record density of black comprises a constant selecting circuit for generating signals for switching over, in response to the image density signals, a predetermined first group of constants each being associated with respective one of the image density signals, multipliers for multiplying the first group of constants selected by the signals generated by the constant selecting circuit by the image density signals associated with the first group of constants, constant signal generating circuits for generating signals representative of a second group of constants, and adders for adding signals outputted by the multipliers and signals outputted by the constant signal generating circuits.

Further, in accordance with the present invention, a color converting device comprises a constant selecting circuit for generating constant selecting signals for selecting constants each being associated with respective one of image density signals each of which is representative of a particular color separated image density, product sum processing circuits for producing product sums of the constants selected by the constant selecting signals and the image density signals, and a designating circuit for designating at least one of a full-color recording area and a monocolor recording area. The constant selecting circuit has a constant selecting signal generating circuit for generating, while the image density signals lie in the area designated by the designating circuit, either one of first constant selecting signals associated with values of the image density signals and second constant selecting signals which are not related to the image density signals and, while the image density signals lie in an area other than the designated area, generating the other constant selecting signals.

BRIEF DESCRIPTION OF THE DRAWINGS

The above and other objects, features and advantages of the present invention will become more apparent from the following detailed description taken with the accompanying drawings in which:

FIG. 1 is a block diagram schematically showing a color copier which incorporates a color information converting device embodying the present invention;

FIG. 2B is a block diagram schematically showing an alternative construction of color correction processing unit;

FIG. 11A is a view showing specific data which may be written to a RAM of a constant memory circuit shown in FIG. 3; and FIG. 11B is a view showing specific data which may be written to a RAM of another constant memory circuit also shown in FIG. 3.

DESCRIPTION OF THE PREFERRED EMBODIMENT

Figure 2A:
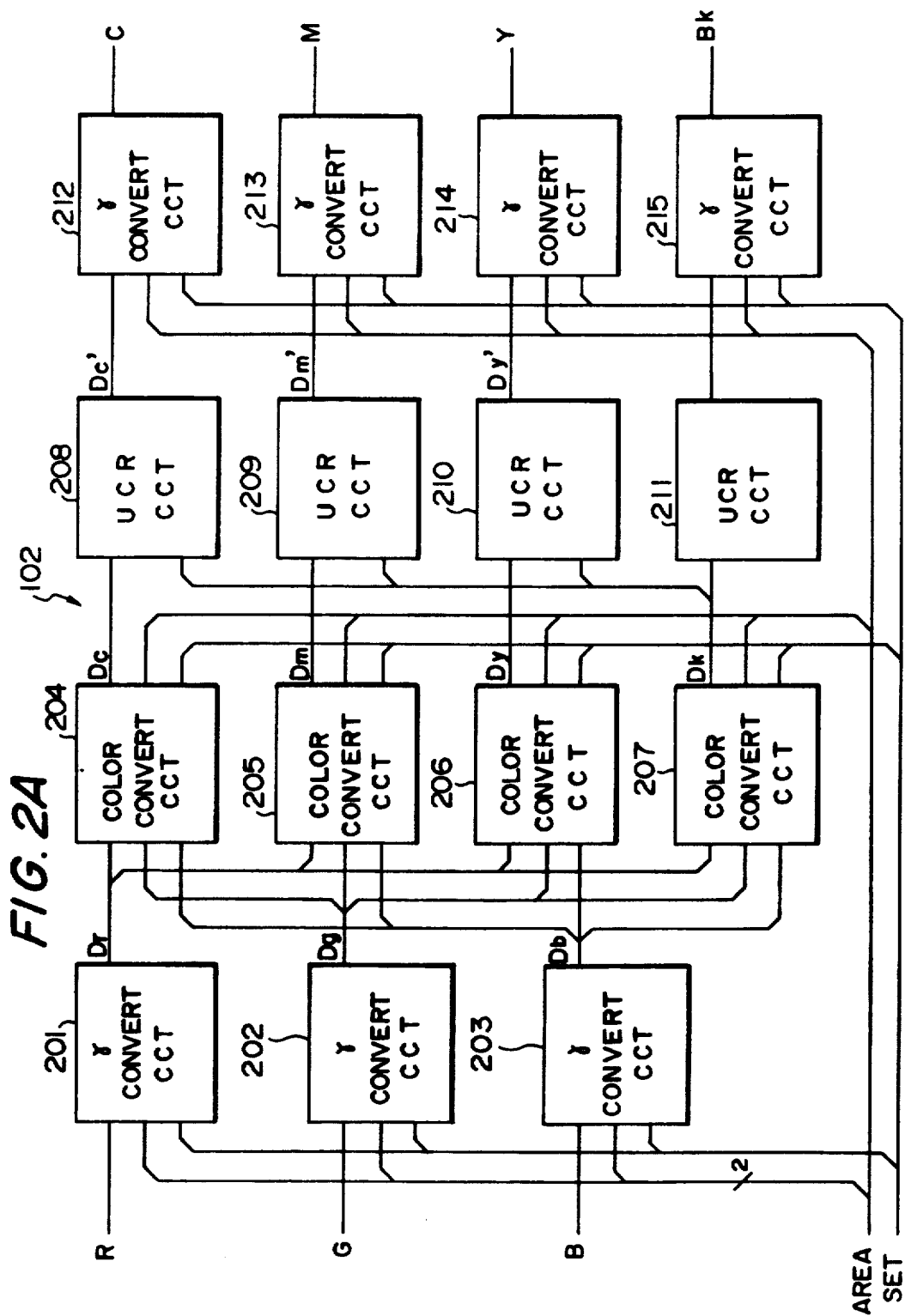
FIG. 2A is a block diagram schematically showing a specific construction of a color correction processing unit included in the arrangement of FIG. 1.

Referring to FIG. 1 of the drawings, a color copier incorporating a color information converting device embodying the present invention is shown. As shown, the color copier has an image reading unit 101 implemented as a CCD image sensor, for example. The image reading unit 101 separates document information into red (R), green (G) and blue (B) light amount data by a resolution of about 16 pixels per millimeter (400 dots per inch), thereby producing 8-bit image signals R, G and B. The image signals R, G and B are fed to a color correction processing unit 102 which is representative of an embodiment of the present invention. In response to the image signals R, G and B, the color correction processing unit 102 performs so-called gamma correction, masking and other conventional processing to determine the amounts of recording of four different coloring materials, i.e., cyan (C), magenta (M), yellow (Y) and black (Bk) coloring materials, whereby raster scan type 8-bit image signals C, M, Y and Bk are outputted. These image signals C, M, Y and Bk are applied to a color laser printer or similar image recording unit 103. In response, the image recording unit 103 records an image on a paper sheet by using cyan, magenta, yellow and black coloring materials by a resolution of about 16 pixels per millimeter (400 dots per inch), for example. A timing control unit 104 generates synchronizing (sync) signals CLK adapted for the individual raster scan type image signals, and area signals AREA indicative of switchover timings of processing modes which will be described. The signals CLK and AREA are fed to the image reading unit 101, color correction processing unit 102, image recording unit 103, etc. An operating unit 106 is accessible for entering processing modes and other various conditions while displaying the entered modes and conditions. A system control unit 105 supervises the entire color copier. Specifically, the system control unit 105 detects the inputs on the operating unit 106 while controlling the display, and conditions the image reading unit 101, color correction processing unit 102, image recording unit 103, and timing control unit 104 in response to the inputs on the operating unit 106.

FIG. 2A shows a specific construction of the color correction processing unit 102 in detail. As shown, the color correction processing unit 102 has gamma (γ) conversion circuits 201, 202 and 203 which correct respectively the tone characteristics of the image signals R, G and B and execute various kinds of processing such as logarithmic transform, thereby producing 8-bit image density signals Dr, Dg and Db. Implemented by RAMs, for example, the gamma conversion circuits 201 to 203 each has a plurality of LUTs (Look-Up Tables) which are used to adjust the density of an output image and to switch over the execution/non-execution of negative-to-positive inversion under the control of the area signal AREA. The LUTs are individually updated by a set signal SET, which is generated by the system control unit 105, on the basis of the set density, the kind of processing, and so forth. Each of the gamma conversion circuits 201 to 203 outputs 0 (zero) when the converted density is 0, 255 when the converted density is 1.5, and so forth. The image density signals Dr, Dg and Db from the gamma conversion circuits 201 to 203 each is delivered to color conversion circuits 204 to 207. The color conversion circuits 204 to 207 process the image density signals Dr, Dg and Db to determine the equivalent nonchromatic densities (ENDs) of the cyan, magenta, yellow and black coloring materials, respectively. By such processing, the color conversion circuits 204 to 207 produce 8-bit record density signals Dc, Dm, Dy and Dbk, respectively. It is to be noted that the record density signals Dc, Dm and Dy outputted by the color conversion signals 204, 205 and 206, respectively, are representative of the ENDs of cyan, magenta and yellow coloring materials when such coloring materials are used to record an image.

The color conversion circuits 204 to 207 are each made up of a multiplier, adder, RAM, and so forth as will be described later specifically, and they execute processing equivalent to conversion processing as represented by:

$$Dx = Kxr \cdot Dr + Kxg \cdot Dg + Kxb \cdot Db + kxo \qquad \text{Eq. (1)}$$

where Kxr, Kxg and Kxb are a first group of constants, Kxo are a second group of constants, and x is c, (cyan), m (magneta), y (hellow), or k (black).

The constants implementing the above processing are each made up of a plurality of different constants and are written to the RAM by the set signal SET from the system control unit 105. The plurality of constants are changed over by, for example, the area signal AREA fed from the timing control unit 104. In the illustrative embodiments, the area signals AREA applied to the color conversion circuits 204 to 206 are assumed to be identical.

The record density signals Dc, Dm and Dy from the color conversion circuits 204, 205 and 206 are fed to UCR (Undercolor Removal) circuits 208, 209 and 210, respectively, while the record density signal Dk from the color conversion circuit 207 is fed to the UCR circuits 208 to 210 and a delay circuit 211. In response to the record density signal Dk from the color conversion circuit 207, the UCR circuits 208 to 210 correct respectively the record density signals Dc, Dm and Dy fed thereto from the color conversion circuits 204 to 206, thereby outputting corrected record density signals D'c, D'm and D'y. The UCR circuits 208 to 210 are implemented as LUTs in the form of ROMs or similar stores. These LUTs each performs processing equivalent to the following conversion processing:

$$D\alpha x = A \cdot (Dx - Dk)/(A - Dk) \qquad \text{Eq. (2)}$$

where A is a constant which is 2 or so, and x is c, m or y.

The delay circuit 211 delays the record density signal Dk in matching relation to the cyan, magenta and yellow record density signals which are respectively delayed by the UCR circuits 208 to 210, whereby a delayed record density signal Dk is produced.

The record density signals D'c, D'm, D'y and Dk from the UCR circuits 208 to 210 are applied to gamma conversion circuits 212, 213, 214 and 215, respectively. The gamma conversion circuits 212, 213, 214 and 215 correct respectively the ENDs represented by the record density signals D'c, D'm, D'y and Dk in conformity to the tone characteristic of the image recording unit 103 and thereby applies resultant 8-bit image signals C, M, Y and Bk to the image recording unit 103. The gamma conversion circuits 212 to 215, like the gamma conversion circuits 201 to 203, each has a plurality of LUTs for switching over the processing on the basis of the kind of an image, e.g. picture/character. These LUTs are switched over by the area signals AREA from the timing control unit 104 and are updated by the set signals SET from the unit 104.

Although not shown in FIG. 2A, the sync signals CLK are fed from the timing control unit 104 to the individual circuits 201 to 215 to cause them to operate in synchronism with the sync signals CLK.

The color copier having the above construction is of the type recording cyan, magenta, yellow and black coloring components at the same time and, for this reason, the color correction processing unit 102 produces the recording amounts of the cyan, magenta, yellow and black coloring components at one time. Alternatively, when a color copier of the type recording four different coloring materials one after another, the color correction processing unit 102 may be constructed as shown in FIG. 2B.

In FIG. 2B, gamma conversion circuits 1101, 1102 and 1103 are constructed in the same manner as those shown in FIG. 2B. Specifically, the circuits 1101 to 1103 correct the tone characteristic of the image signals R, G and B fed thereto from the image reading unit while executing various kinds of processing such as logarithmic transform, thereby producing 8-bit image density signals Dr, Dg and Db. The image density signals Dr, Dg and Db each is applied to color conversion circuits 1104 and 1105 which are similar to the color conversion circuits of FIG. 2A. By processing the image density signals Dr, Dg and Db, each of the color conversion circuits 1104 and 1105 determines the END of a cyan, magenta, yellow or black coloring material so as to produce an 8-bit record signal Dc/Dm/Dy or Dk. The constants to be used for this processing are written by the set signals SET from the system control unit 105, in matching relation to the color of the coloring material or similar factor. The record density signal Dc/Dm/Dy outputted by the color conversion circuit 1104 is applied to a UCR circuit 1106, while the record density signal Dk from the color conversion circuit 1105 is applied to the UCR circuit 1106 and a delay circuit 1107. The UCR circuit 1106 and delay circuit 1107 are respectively similar to the UCR circuit and delay circuit of FIG. 2A. The UCR circuit 1106 corrects the input record density signal Dc/Dm/Dy in response to the record density signal Dk to produce a corrected record density signal D'c/D'm/D'y. The delay circuit 1107 delays the record density signal Dk in matching relation to the cyan, magneta or yellow record density signal which is delayed by the UCR circuit 1106, thereby outputting a delayed record density signal Dk.

The record density signal D'c/D'm/D'y and the delayed record density signal Dk are fed to a selector circuit 1108. The selector circuit 1108 selects either one of the record density signals D'c/D'm/D'y and Dk in response to the area signal AREA which is generated by the timing control unit and determined by a recording color, thereby outputting an image density signal D'c/D'm/D'y/Dk. The output of the selector circuit 1108 is delivered to a gamma conversion circuit 1109 similar to the gamma conversion circuit of FIG. 2A. In response, the gamma conversion circu t 1109 corrects the END rep sented by the record density signal D'c/D'm/D'y/Dk in matching relation to the tone characteristics of the individual coloring materials, whereby 8-bit image signals C/M/Y/Bk are produced. The gamma conversion circuit 1109 has LUTs which are updated color by color by the set signal SET from the system control unit.

Although not shown in FIG. 2B, the sync signals CLK from the timing control unit are coupled to the circuits 1101 to 1109 in order to cause them to operate in synchronism with the sync signals CLK.

The color correction processing unit 102 having the above construction and to which the presen: invention is applied processes image density signals Dr, Dg and Db produced by separating a document into different colors, and determines the END of a black coloring material and the ENDs of the other coloring materials (cyan, magenta and yellow) in parallel. This is advantageous in that the record density signal Dk and the record density signals Dc, Dm and Dy are delayed by the same amount eliminating the need for an extra delay circuit external to the color correction processing unit 102.

Figure 3:
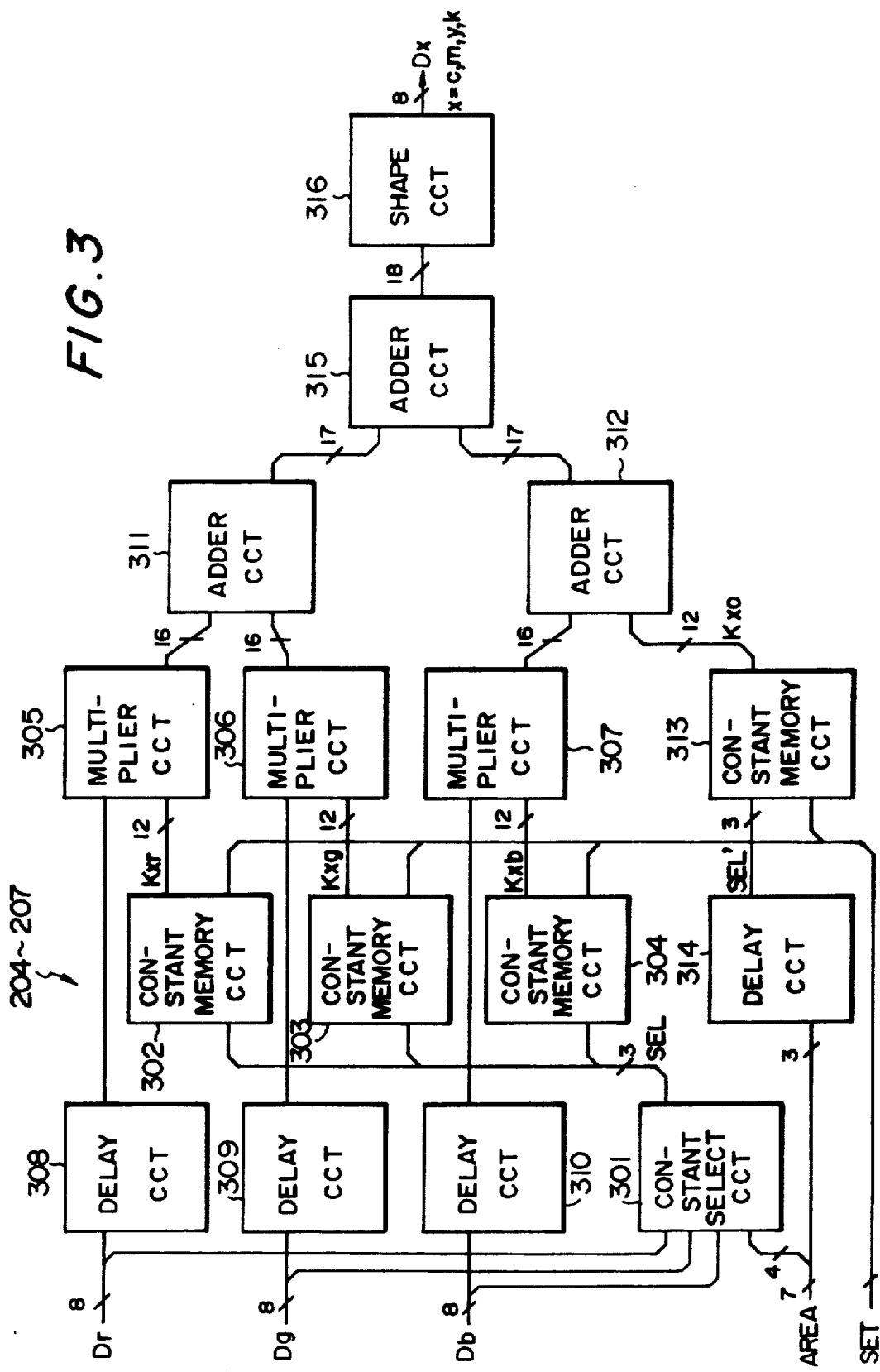
FIG. 3 is a block diagram schematically showing a specific construction of a color conversion circuit shown in FIG. 2A.

FIG. 3 shows the construction of any one of the color conversion circuits 204 to 207. As shown, the color conversion circuit has a constant selecting circuit 301 for outputting a 3-bit constant selection signal SEL in response to four bits of the area signal AREA fed from the timing control unit 104. The signal SEL is a signal determined by the relationship of the image density signals Dr, Dg and Db to one another or a signal directly determined by the area signal AREA.

Figure 4:
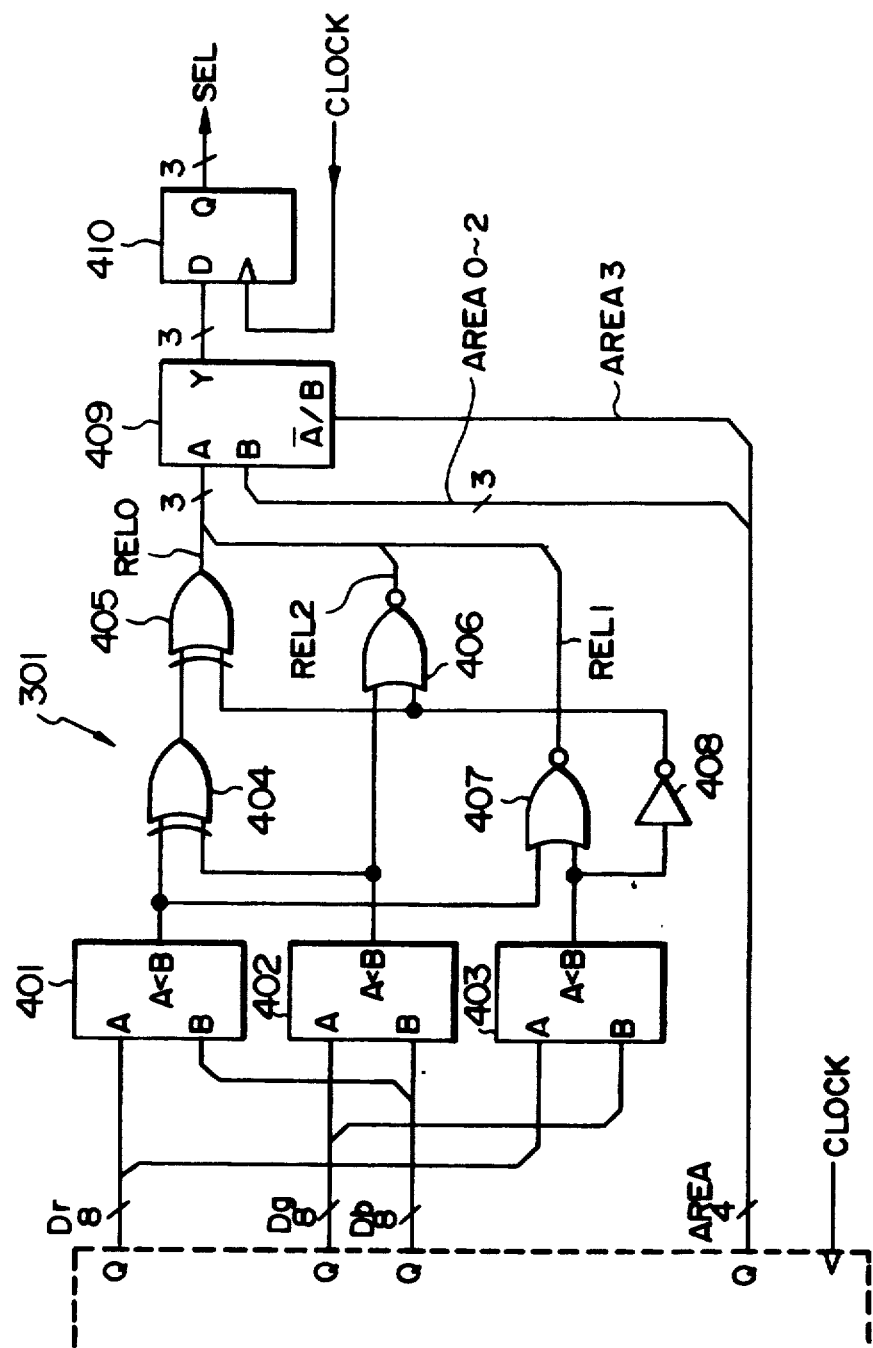
FIG. 4 is a block diagram schematically showing a specific construction of a constant selecting circuit shown in FIG. 3.

Referring to FIG. 4, the constant selecting circuit 301 will be described in more detail. As shown, the circuit 301 has 8-bit comparators 401, 402 and 403 for comparing the input image density signals Dr and Db, Dg and Db, and Dr and Dg, respectively. The output of the comparator 401 is in a high level or "H" if $Dr < Db$ or in a low level or "L" if otherwise, while the output of the comparator 402 is "H" if $Dg < Db$ or "L" if otherwise. The output of the comparator 403 is "H" if $Dr < Dg$ or "L" if otherwise. The outputs of the comparators 401 to 403 are routed through EXOR (Exclusive-OR) gates 404 and 405, NOR gates 406 and 407, and an inverter 408 to produce 3-bit relation signals REL0 to REL2. The relation signals REL0 to REL2 are fed to a selector 409. The outputs of the comparators 401 to 403, the relationship of the image density signals Dr, dg and Db, and the relationship of the relation signals REL0 to REL2 are related as listed below in Table 1.

TABLE 1

| COMPARATOR OUTPUT | | | | REL | | |
|---|---|---|---|---|---|---|
| $Dr < Dg$ | $Dg < Db$ | $Dr < Db$ | RELATION | 2 | 1 | 0 |
| H | H | H | $Dr < Dg < Db$ | L | L | L |
| L | H | H | $Dg \leq Dr < Db$ | L | L | H |
| L | H | L | $Dg < Db \leq Dr$ | L | H | L |
| L | L | L | $Db \leq Dg \leq Dr$ | L | H | H |
| H | L | L | $Db \leq Dr < Dg$ | H | L | L |
| H | L | H | $Dr < Db \leq Dg$ | H | L | H |

Area signals AREA0 to AREA2 and an area signal AREA3 are respectively applied to the other input terminal and a select terminal of the selector 409. The relation signals REL0 to REL2 or the area signals AREA0 to AREA2 are selected depending on the area signal AREA3, and then fed to a D flip-flop 410. The D flip-flop 410 has a clock terminal to which a pixel sync signal CLOCK that is one of the sync signals CLK is applied. The D flip-flop 410 latches the output of the selector 409 and delivers it as the 3-bit constant selection signal SEL. The constant selecting circuit 301 receives the image density signals Dr, Dg and Db and area signals AREA in synchronism with the pixel sync signal CLOCK.

Referring again to FIG. 3, the constant selection signal SEL from the constant selecting circuit 301 is fed to constant memory circuits 302, 303 and 304. The constant memory circuits 302, 303 and 304 are implemented as, for example, 8 words×12 bits RAMs for storing respectively the constants Kxr, Kxg and Kxb of the Eq. (1). When accessed by an address signal in the form of the constant selection signal EL, the RAMs 302, 303 and 304 produce selected constants as 12-bit constant signals Kxr, Kxg and Kxb, respectively. The 12-bit constant signals Kxr, Kxg and Kxb each is a fixed decimal point signal having a sign ($-8 \leq Kxr$, Kxg, $Kxb < 8$). Each of the constant memory circuits 302 to 304 also has a circuit for allowing data to be written to the RAM by the set signal SET from the system control unit 105, a D flip-flop for outputting the constant signal Kxr, Kxg or Kxb in synchronism with the pixel sync signal CLOCK, etc.

The constant signals Kxr, Kxg and Kxb from the constant memory circuits 302 to 304 are applied to multipliers 305, 306 and 307, respectively. The image density signals Dr, Dg and Db are fed to the other input terminal of the multipliers 305, 306 and 307 via delay circuits 308, 309 and 310, respectively. The delay circuits 308, 309 and 310 delay respectively the image density signals Dr, Dg and Db and thereby compensates for the delay of the first group of constant signals Kxr, Kxg and Kxb which are generated by the constant memory circuits 302, 303 and 304. The multiplier circuits 305 to 307 multiply respectively the image density signals Dr, Dg and Db and the first group of constant signals Kxr, Kxg and Kxb, and each produces upper sixteen bits of the associated product in synchronism with the pixel sync signal CLOCK. The outputs of the multiplier circuits 305 to 307 are fed to adder circuits 311 and 312. A constant memory circuit 313 stores a second group of constants, i.e., the second group of constants Kxo of the Eq. (1) and is constructed in the same manner as the constant memory circuits 302 to 304. Among the area signals AREA, 3-bit signals (AREA 4 to AREA 6) different from the area signals AREA applied to the constant selecting circuit 301 is fed to the constant memory circuit 313 via a delay circuit 314. Addressed by such a signal, the constant memory circuit 313 produces a second group of 12-bit constant signals Kxo. The second group of 12-bit constant signals Kxo are fixed decimal point signals with signs ($-2048 \leq Kxo < 2048$). The delay circuit 314 compensates for the delay particular to the constant selecting circuit 301 and multiplier 305.

The second group of constant signals Kxo are fed from the constant memory circuit 313 to an adder circuit 312. The adder circuits 311 and 312 sum the outputs of the multiplier circuits 305 to 307 and the output of the constant memory circuit 313, and each delivers the resulted sum to an adder circuit 315. The adder circuit 315 sums the outputs of the adders 311 and 312 and feeds the sum to a shaping circuit 316. The shaping circuit 316 shapes the output of the adder circuit 315 to eight bits. Specifically, the circuit 316 replaces, for example, the result of addition with "0" if it is negative and with "255" if it is greater than "255", thereby outputting the 8-bit record density signal Dx in synchronism with the pixel sync signal CLOCK.

As stated above, the color conversion circuits 204 to 207 execute processing equivalent to the conversion processing represented by the Eq. (1).

Hereinafter will be described the first group of constants Kxr, Kxg and Kxb and the second group of constants Kxo which are stored in the color conversion circuits 204 to 207 in a full color mode.

Figure 5:
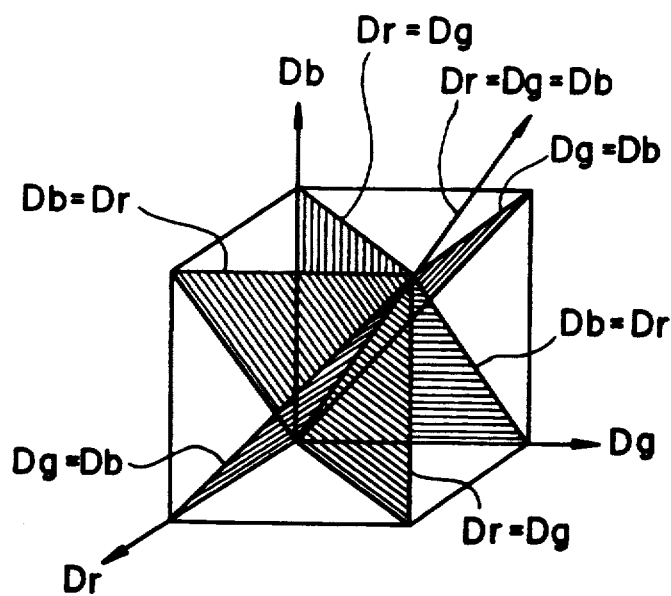
FIGS. 5 and 6 are graphs useful for understanding the contents of color correction processing as executed by the color correction processing unit.

The color conversion processing to which the present invention pertains is based on so-called masking. Nevertheless, so far as full color processing is concerned, the present invention constitutes an improvement over the conventional masking. Specifically, as shown in FIG. 5, the present invention divides a color space defined by image densities Dr, Dg and Db by planes that extend radially about nonchromatic color axis (Dr=Dg=Db), assigns different constants Kxr, Kxg, Kxb and Kxo for color conversion processing to each of the divided color space (hereinafter simply referred to as color spaces), and executes color conversion processing by using such constants.

The color conversion constants Kxr, Kxg, Kxb and Kxo in a single color space are determined as follows.

Figure 6:
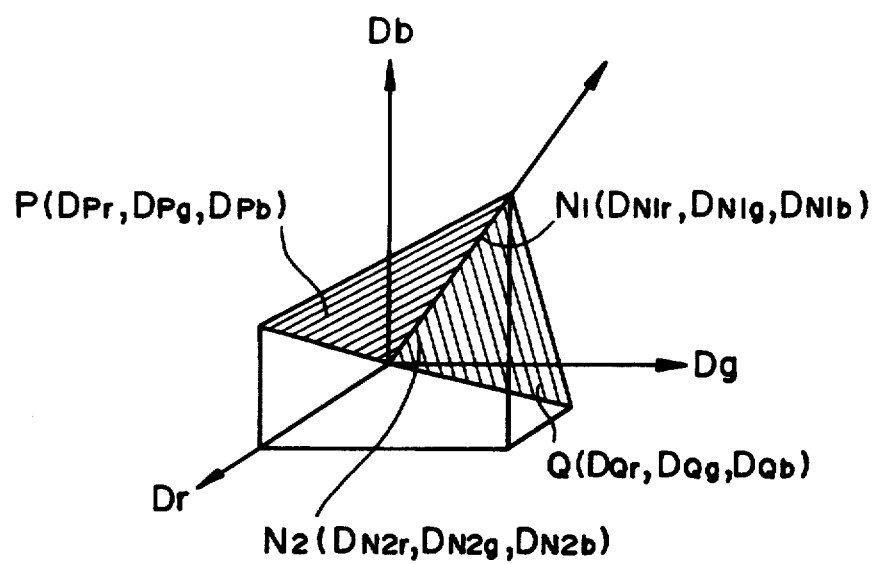

For example, as shown in FIG. 6, chromatic colors P and Q ($Dr \neq Dg$ or $Dg \neq Db$ or $Db \neq Dr$) are each assigned to respective one of two planes which divide the color space, while different chromatic colors N1 and N2 (Dr=Dg=Db) are each assigned to the nonchromatic color axis. The image densities Dr, Dg and Db of the chromatic colors P and Q and those of the nonchromatic colors N1 and N2, and the record densities Dxc, Dxm, Dxy and Dxk of cyan, magenta, yellow and black coloring materials which are optimum for recording the chromatic colors P and Q and nonchromatic colors N1 and N2 are determined. Assume that the image densities of the chromatic colors P and Q are respectively (Dpr, Dpg, Dpb) and (DQr, DQg, DQb), and that the image densities of the nonchromatic colors N1 and N2 are respectively (DN1r, DN1g, DN1b) and (DN2r, DN2g, DN2b). Further, assume that the record densities of the chromatic colors P and Q are respectively (Dpc, Dpm, Dpy, Dpk) and (DQc, DQm, DQy, DQk), and that the record densities of the nonchromatic colors N1 and N2 are respectively (DN1c, DN1m, DN1y, DN1k) and (DN2c, DN2m, DN2y, DN2k). Then, the color conversion constants Kcr to Kko in the color space of interest are determined by the following equation:

$$\begin{pmatrix} Kcr & Kcg & Kcb & Kco \\ Kmr & Kmg & Kmb & Kmo \\ Kyr & Kyg & Kyb & Kyo \\ Kkr & Kkg & Kkb & Kko \end{pmatrix} = \qquad \text{Eq. (3)}$$

$$\begin{pmatrix} Dpc & DQc & DN1c & DN2c \\ Dpm & DQm & DN1m & DN2m \\ Dpy & DQy & DN1y & DN2y \\ Dpk & DQk & DN1k & DN2k \end{pmatrix} \times$$

$$\begin{pmatrix} Dpr & DQr & DN1r & DN2r \\ Dpg & DQg & DN1g & DN2g \\ Dpb & DQb & DN1b & DN2b \\ 1 & 1 & 1 & 1 \end{pmatrix}^{-1}$$

The image densities and record densities of the chromatic colors P and Q and nonchromatic colors N1 and N2 are provided with optimum values in matching relation to the spectral characteristics of the image reading unit 101 and image recording unit 103 used. Such optimum values may be determined experimentally such that the difference in color and the difference in density between the read and recorded images are minimized. If the four colors (chromatic colors P and Q and nonchromatic colors N1 and N2) are selected such that none of them resides in the same plane in the color space defined by the image densities Dr, Dg and Db, it is possible to represent any desired colors. Further, by selecting the two non-chromatic colors N1 and N2 common to all the color spaces and the chromatic colors P and Q in the two adjoining planes and by using the chromatic colors P and Q in the event of determining the color conversion constants of the adjoining color spaces, as shown in FIG. 6, it is possible to prevent the result of color conversion processing from being discontinuous at the boundary between nearby color spaces.

As shown in FIG. 5, the illustrative embodiment changes the color conversion constant from one to another of the six color spaces which are defined by planes Dr=Dg, Dg=Db and Db=Dr by using the nonchromatic color axis (Dr=Dg=Db). Hence, the constant selecting circuit 301, FIGS. 3 and 4, determines in which of the six color spaces Dr, Dg and Db reside and produces the signal SEL indicative of the determined color space. The signal SEL is fed to the constant memory circuits 302 to 304 as a constant specifying signal.

Specific image densities Dr, Dg and Db of the six chromatic colors in the adjoining color planes and two chromatic colors common to all the color planes and their associated specific record densities Dx (x=c, m, y, k) are listed below in Table 2.

TABLE 2

|  | IMAGE DENSITY | | | RECORD DENSITY | | | |
|---|---|---|---|---|---|---|---|
|  | Dr | Dg | Db | Dc | Dm | Dy | Dk |
| CHROMATIC | 0.302 | 1.000 | 1.000 | 0.000 | 1.387 | 1.012 | 0.000 |
|  | 0.112 | 0.112 | 1.000 | 0.054 | 0.000 | 1.401 | 0.000 |
|  | 1.000 | 0.529 | 1.000 | 1.372 | 0.000 | 1.204 | 0.000 |
|  | 1.000 | 0.510 | 0.510 | 1.345 | 0.000 | 0.546 | 0.000 |
|  | 1.000 | 1.000 | 0.408 | 1.168 | 1.215 | 0.000 | 0.000 |

TABLE 2-continued

|  | IMAGE DENSITY | | | RECORD DENSITY | | | |
|---|---|---|---|---|---|---|---|
|  | Dr | Dg | Db | Dc | Dm | Dy | Dk |
| NON- | 0.423 | 1.000 | 0.423 | 0.228 | 1.558 | 0.000 | 0.000 |
| CHROMATIC | 0.000 | 0.000 | 0.000 | 0.000 | 0.000 | 0.000 | 0.000 |
|  | 1.000 | 1.000 | 1.000 | 1.000 | 1.000 | 1.000 | 1.000 |

As shown below in Table 3, the second constants Kxo in each of the color spaces have the same value (zero). This is because the two nonchromatic colors N1 and N2 are used for all the color spaces to determine the color conversion constants.

TABLE 3

| COLOR SPACE | CONVERSION CONSTANT | | | |
|---|---|---|---|---|
|  | Kcr Kmr Kyr Kkr | Kcg Kmg Kyg Kkg | Kcb Kmb Kyb Kkb | Kco Kmo Kyo Kko |
| Dr < Dg < Db | 1.434 | −0.368 | −0.066 | 0.000 |
|  | −0.555 | 1.681 | −0.126 | 0.000 |
|  | −0.018 | −0.435 | 1.452 | 0.000 |
|  | 1.434 | −0.307 | −0.126 | 0.000 |
| Dg ≦ Dr < Db | 1.856 | −0.791 | −0.066 | 0.000 |
|  | −0.998 | 2.123 | −0.126 | 0.000 |
|  | −0.018 | −0.434 | 1.452 | 0.000 |
|  | −0.997 | 2.123 | −0.126 | 0.000 |
| Dg < Db ≦ Dr | 1.704 | −0.791 | 0.087 | 0.000 |
|  | −1.039 | 2.123 | −0.084 | 0.000 |
|  | 0.073 | −0.434 | 1.361 | 0.000 |
|  | −1.039 | 2.123 | −0.085 | 0.000 |
| Db ≦ Dg ≦ Dr | 1.704 | −0.421 | −0.283 | 0.000 |
|  | −1.039 | 2.402 | −0.363 | 0.000 |
|  | 0.073 | −0.762 | 1.689 | 0.000 |
|  | −1.039 | 0.350 | 1.689 | 0.000 |
| Db ≦ Dr < Dg | 1.622 | −0.339 | −0.283 | 0.000 |
|  | −0.604 | 1.967 | −0.363 | 0.000 |
|  | 0.045 | −0.733 | 1.689 | 0.000 |
|  | 0.044 | −0.733 | 1.689 | 0.000 |
| Dr < Db ≦ Dg | 1.434 | −0.339 | −0.095 | 0.000 |
|  | −0.555 | 1.967 | −0.413 | 0.000 |
|  | −0.018 | −0.733 | 1.751 | 0.000 |
|  | 1.434 | −0.733 | 0.300 | 0.000 |

Since the constants Kxo in the individual color spaces are the same, the embodiment of FIG. 3 directly implements the address signal of the constant memory circuit 313 assigned to the constants Kxo by the area signal AREA. This is successful in saving the RAM capacity of the constant memory circuit 313. The system control unit 105 does not directly write the constants Kxo shown in Table 3 to the constant memory circuits 313 and, instead, writes them, like the gamma conversion circuits 201 to 203, by replacing, for example, the constant "0" with "0" and the constant "1.5" with "255". This is also true with the operation which will be described.

Hereinafter will be described the constants K'xr, K'xg, K'xb and K'xo which are written to the color conversion circuits 204 to 207 in a monocolor mode.

While the color conversion processing in a monocolor mode is executed in the same manner as the processing represented by the Eq. (1), it in practice is executed on the basis of neutral densities Dn produced from the image densities Dr, Dg and Db by using an Eq. (4) which is shown below. The neutral densities Dn correspond to the values produced by transforming the values of colors of an image into densities.

$$Dn = Knr \cdot Dr + Kng \cdot Dg + Knb \cdot Db \qquad \text{Eq. (4)}$$

where Knr, Kng and Knb are constants and will be assumed to be 0.3, 0.5 and 0.2, respectively.

The color conversion constants K'xr, K'xg, K'xb and K'xo are determined by the following procedure. Specifically, neutral densities DN1 and DN2 which are different from each other are selected, and then the record densities of cyan, magenta, yellow and black coloring materials which are optimum for recording colors having the neutral densities DN1 and DN2 are determined. Assuming that the record densities corresponding to the neutral densities DN1 and DN2 are respectively (DN1c, DN1m, DN1y, DN1k) and (DN2c, DN2m, DN2y, DN2k), the color conversion constants Kcr to Kko are produced by:

$$\begin{pmatrix} K'cr & K'cg & K'cb & K'co \\ K'mr & K'mg & K'mb & K'mo \\ K'yr & K'yg & K'yb & K'yo \\ K'kr & K'kg & K'kb & K'ko \end{pmatrix} = \qquad \text{Eq. (5)}$$

$$\begin{pmatrix} Kcn \cdot Knr & Kcn \cdot Kng & Kcn \cdot Knb & Kco \\ Kmn \cdot Knr & Kmn \cdot Kng & Kmn \cdot Knb & Kmo \\ Kyn \cdot Knr & Kyn \cdot Kng & Kyn \cdot Knb & Kyo \\ Kkn \cdot Knr & Kkn \cdot Kng & Kkn \cdot Knb & Kko \end{pmatrix}$$

where $$\begin{pmatrix} Kcn & Kco \\ Kmn & Kmo \\ Kyn & Kyo \\ Kkn & Kko \end{pmatrix} = \begin{pmatrix} DN1c & DN2c \\ DN1m & DN2m \\ DN1y & DN2y \\ DN1y & DN2k \end{pmatrix} \times \begin{pmatrix} DN1 & DN2 \\ 1 & 1 \end{pmatrix}^{-1} \qquad \text{Eq. (6)}$$

When the color conversion constants Kcr to Kko are determined by using the two neutral densities DN1 and DN2 and the record densities (DN1c, DN1m, DN1y, DN1k) and (DN2c, DN2m, DN2y and DN2k) respectively associated with N1 and N2 as stated above, not only the color of an image portion (e.g. ND1=1.5) but also the color of a background portion (DN=0) can be selected as desired and, in addition, an image can be recorded without the tone thereof being affected. This promotes versatile monocolor recording. Such monocolor recording can be implemented by the circuiry shown in FIG. 3, as will become understood from the following description.

Specific neutral densities DN1 (=0) and DN (=1) and their associated record densities Dxc, Dxm, Dxy and Dxk are shown below in Table 4.

TABLE 4

| NEUTRAL DENSITY | | RECORD DENSITY | | | |
|---|---|---|---|---|---|
|  |  | DXc | DXm | DXy | DXk |
| DN1 | 0.000 | 0.000 | 0.000 | 0.000 | 0.000 |
| DN2 | 1.000 | 1.000 | 0.000 | 0.000 | 0.000 |

Specific color conversion coefficients K'xr, K'xg and K'xb and K'xo in a monocolor mode which were obtained from the data of Table 4 are shown below in Table 5.

TABLE 5

| K'cr | K'cg | K'cb | K'co | 0.300 | 0.500 | 0.200 | 0.000 |
|---|---|---|---|---|---|---|---|
| K'mr | K'mg | K'mb | K'mo | 0.000 | 0.000 | 0.000 | 0.000 |
| K'yr | K'yg | K'yb | K'yo | 0.000 | 0.000 | 0.000 | 0.000 |

TABLE 5-continued

| K'kr | K'kg | K'kb | K'ko | 0.000 | 0.000 | 0.000 | 0.000 |

Figure 7A:
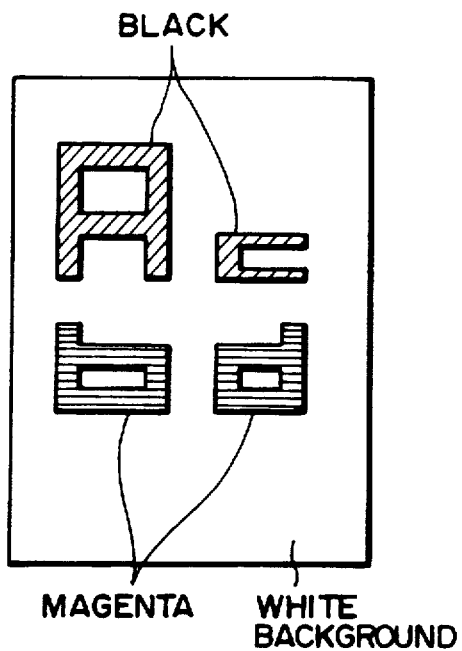
FIGS. 7A and 7B are plan views each showing a document image.
Figure 7B:
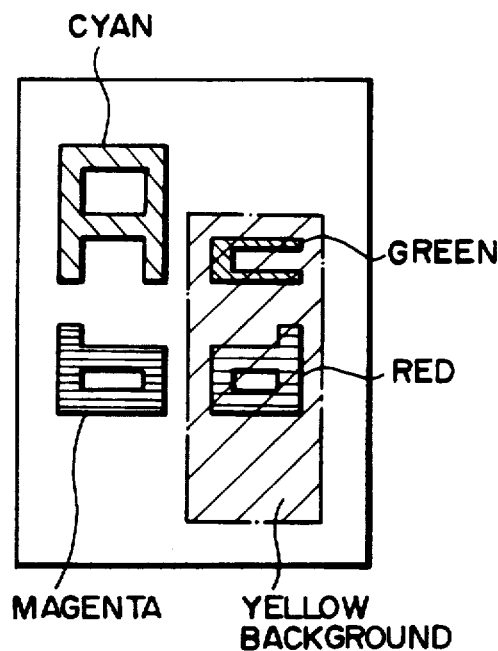

FIG. 7A shows a specific document image, while FIG. 7B shows a recorded image associated with the document image. In FIG. 7B, a certain area is provided with an undercolor as indicated by a dash-and-dots line, and other limited areas are rendered in monochromatic colors. Such a recording is produced by color conversion processing which will be described.

Figure 8A:
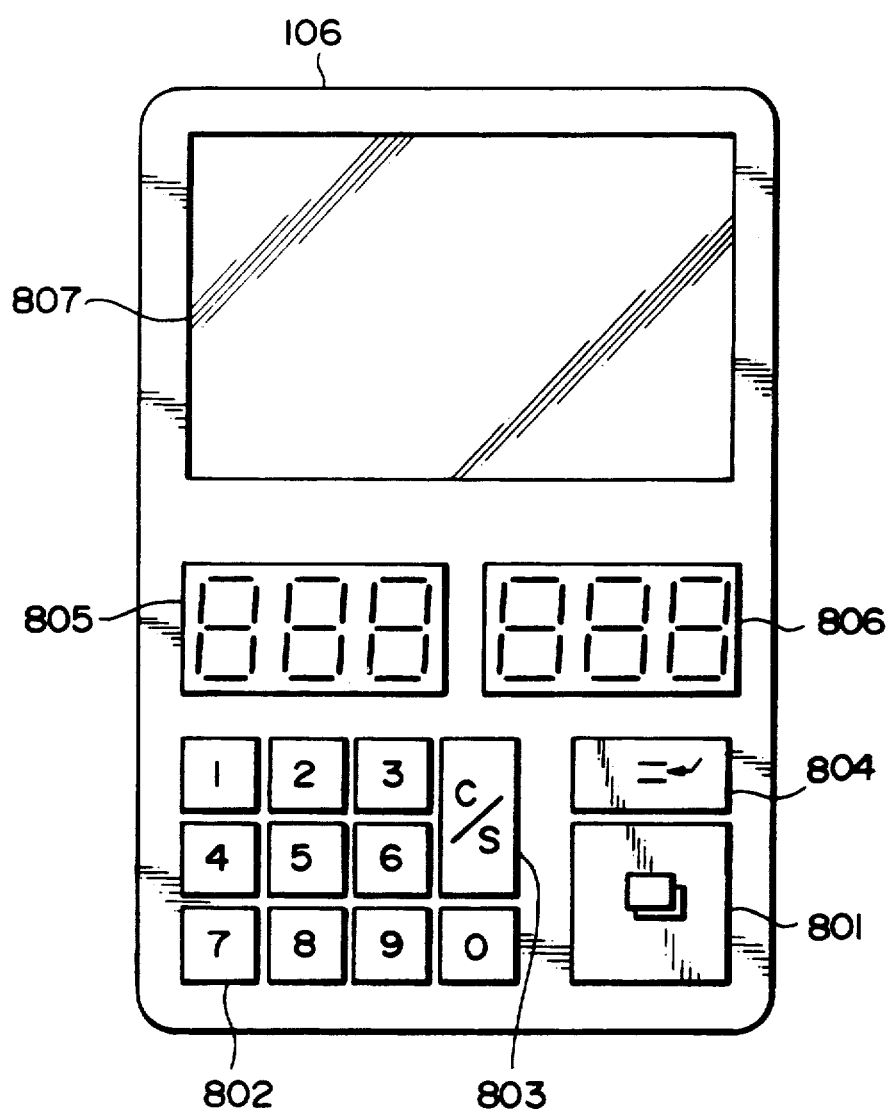
FIG. 8A is a plan view of an operating unit included in the arrangement of FIG. 1.
Figure 8B:
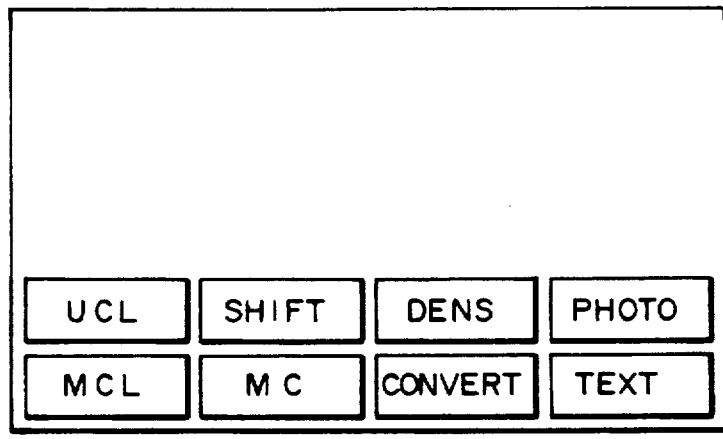
FIGS. 8B, 8C and 8D are plan views each showing a touch panel display forming a part of the operating unit.
Figure 8C:
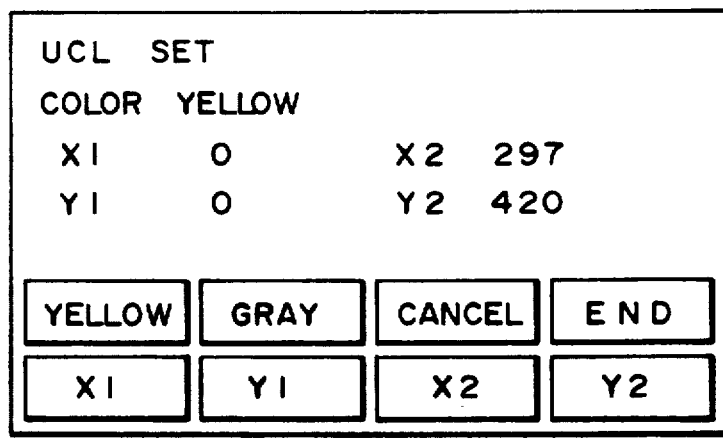

FIG. 8A is an external view of the operating unit 106. As shown, the operating unit 106 has a copy start key 801, numeral keys 802, a clear/stop key 803, an interrupt key 804, a set number display 805, a copy number display 806, and touch panel display 807. The touch panel display 807 is constituted by a display and a panel which is affixed to the surface of the display and provided with a plurality of arrays of transparent touch switches. Specifically, it has a display section and an input section which are combined together, i.e., the touch panel display 807 is accessible for selecting various operation modes while displaying the selected modes and input guidances. FIG. 8B shows the screen of the touch panel display 807 is a standard condition. In FIG. 8B, it is possible to select various operation modes such as an undercolor mode, monocolor mode, magnification change mode, etc. When the operator touches the portion of the display 807 which is labeled "UCL", an undercolor mode is set up resulting in the screen being changed to the state shown in FIG. 8C. In the undercolor mode, the operator is allowed to enter the diagonal coordinates (X1, Y1) and (X2, Y2) of a rectangular area which is to be provided with an undercolor and to select a desired undercolor. Specifically, the operator enters the coordinates by pressing the portions labeled "X1", "Y1", "X2" and "Y2" and the numerical keys 802, while entering a desired undercolor by pressing any one of the portions labeled "YELLOW" and "GRAY". The setting of the undercolor is completed when the operator presses the portion labeled "END", and it is cancelled when the operator presses the portion labeled "CANCEL".

Figure 8D:
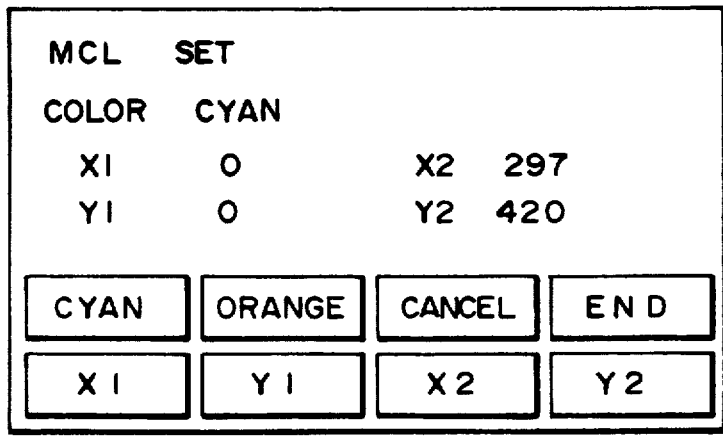

In the condition shown in FIG. 8B, when the operator presses the portion labeled "MCL", a monocolor mode is set up with the screen being changed to the state shown in FIG. 8D. In the monocolor mode, the operator is allowed to enter the diagonal coordinates (X1, Y1) and (X2, Y2) of a rectangular area which is to be rendered in a monochromatic color and to select a recording color. Specifically, the operator presses the portions "X1", "Y1", "X2" and "Y2" and then presses the numeral keys 802 to enter numerical values. This setting is also completed when the operator presses the portion "END" or cancelled when the operator presses the portion "CANCEL". When a desired color is selected in the condition shown in FIG. 8D, only the record densities (DN2c, DN2m, DN2y, DN2k) of the neutral density DN2 shown in Table 4 are varied with the record densities (DN1c, DN1m, DN1y, DN1k) of the other neutral density DN1 being held the same.

The control over the display and the detection of the operation are performed by the system control unit 105. On the completion of undercolor setting, the system control unit 105 reads predetermined constants K"co, K"mo, K"yo and K"ko associated with the selected undercolor out of a built-in ROM thereof and writes them to predetermined addresses of the constant memory circuits 313 by a set signal SET. On the completion of monocolor setting, the system control unit 105 reads predetermined constant K'cr to K'ko associated with the selected monochromatic color out of a built-in ROM and writes them to the constant memory circuits 302 to 304 and 313 by the set signal SET. Further, before the start of a copying operation, the system control unit 105 reads the constants Kcr to Kko assigned to ordinary full-color copying out of a built-in ROM and writes them to the constant memory circuits 302 to 304 and 313 of the color conversion circuits 204 to 207 by the set signal SET.

The description will proceed on the assumption that the constants Kcr to Kkb shown in Table 3 and assigned to full-color are sequentially written to the addresses 0 to 5 of the constant memory circuits 302 to 304 of the color conversion circuits 204 to 207 in the order shown in Table 3, that the constants Kco, Kmo, Kyo and Kko shown in Table 3 are written to the address 0 of the constant memory circuit 313, that the constants K'cr to K'kb shown in Table 5 and assigned to monocolor are written to the addresses 6 of the constant memory circuits 302 to 304, that the constants K'co, K'mo, K'yo and K'ko shown in Table 5 are written to the address 1 of the constant memory circuit 313, and that the constants K"co, K"mo, K"yo and K"ko assigned to undercolor are written to the address 3 of the constant memory circuit 313.

When an undercolor of light yellow (yellow background) is desired by way of example, the constants K"co, K"mo and K"ko will be 0 and the constant K"yo will be 0.5.

By the writing operation stated above, the RAM of the constant memory circuit 302 of the color conversion circuit 204 is loaded with 12-bit data (hexadecimal) as shown in FIG. 11A, while the RAM of the constant memory circuit 313 of the color conversion circuit 206 is loaded with 12-bit data (hexadecimal) as shown in FIG. 11B. The addresses of each RAM where data to be written do not exist are loaded with zero. The system control unit 105 conditions the constant memory circuit 313 in conformity to the addresses of the constant memory circuit 313 where the entered coordinates and constants are written.

Figure 9:
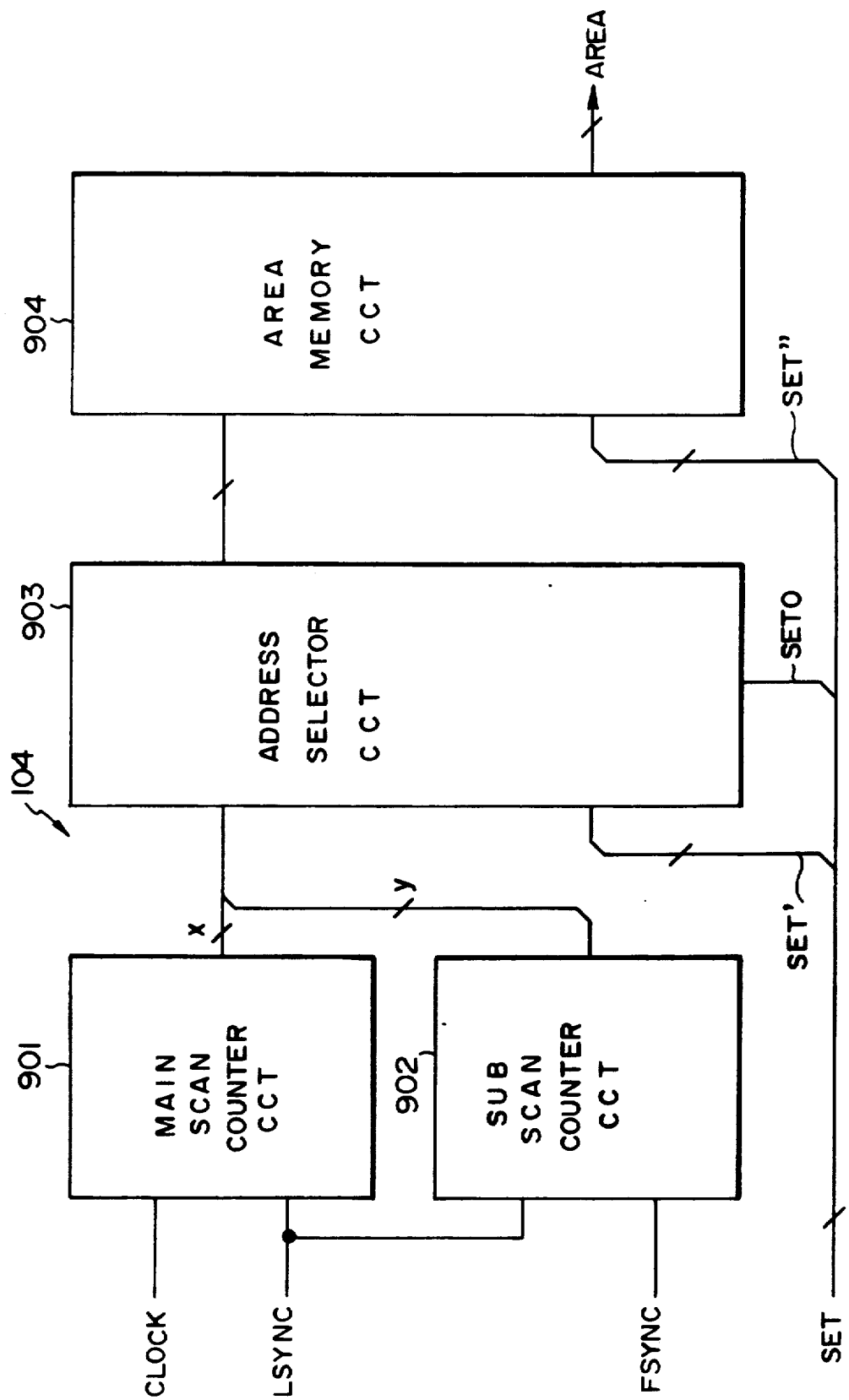
FIG. 9 is a block diagram schematically showing a part of a timing control unit also included in the arrangement of FIG. 1.

Referring to FIG. 9, a specific construction of a part of the timing control unit 104 which generates the area signals AREA is shown. As shown, a main scanning counter circuit 901 counts the pixel sync signal CLOCK while outputting the upper bit x of the count. The count of the counter circuit 901 is cleared by a line sync signal LSYNC which is one of the sync signals CLK. A sub-scanning counter circuit 902 counts the line sync signal LSYNC while outputting the upper bit y of the count. The count of the counter circuit 902 is cleared by a frame sync signal FSYNC which is another sync signal CLK. The signals x and y outputted by the counter circuits 901 and 902, respectively, are applied to an address selecting circuit 903. The address selecting circuit 903 selects the signals x and y or a particular signal group SET' of the set signal SET in response to a given bit SET0 of the set signal SET. Specifically, the circuit 903 selects the set signal SET' when the system control unit 105 writes data to an area memory circuit 904 or selects the signals x and y when a copying operation is effected. Implemented as a RAM, for example, the area memory circuit 904 uses the output of the address selecting circuit 903 as an address signal, outputting data stored in the RAM as the area signal AREA.

The system control unit 105 feeds to the RAM a particular signal group SET" of the set signal SET as a write control signal and data.

Figure 7C:
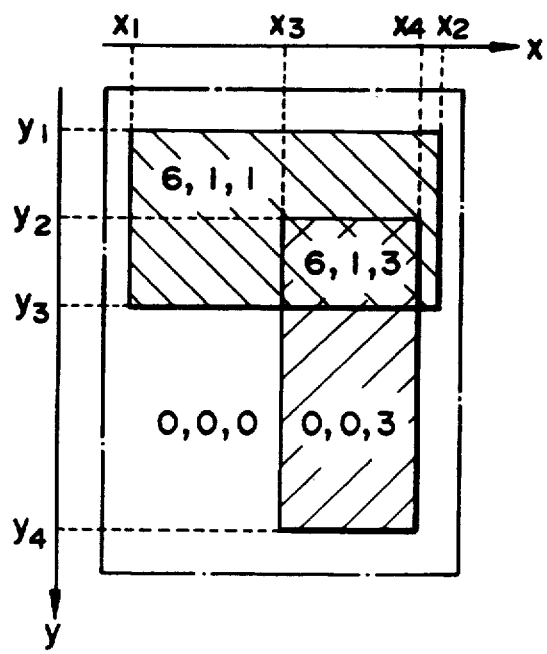
FIG. 7C is a plan view showing specific marked areas of a document which are subjected to color correction processing.

FIG. 7C shows a part of the data stored in the RAM of the area memory circuit 904 (data adapted for the area signal AREA to be fed commonly to the color conversion circuits 204 to 207). In FIG. 7C, x and y are respectively associated with the signals which are outputted by the main scanning and subscanning counter circuits 901 and 902. Also, (x1, y1) and (x2, y2) are representative of positions corresponding to the diagonal coordinates of a monocolor processing area which is entered on the operating unit 106, while (x3, y3) and (x4, y4) are representative of positions corresponding to the diagonal coordinates of an undercolor processing area. As shown, in the area (x1, y1) to (x2, y2) where only monocolor processing is set, the data for selecting the addresses 6 of the RAMS of the constant memory circuits 302 to 304 (AREAs 0 to 2=6 and AREA3=1) and the signals for selecting the address 1 of the RAM of the constant memory circuit 313 are written. In the area (x3, y3) to (x4, y4) where only undercolor is set, the data for selecting the addresses 0 to 5 of the RAMs of the constant memory circuits 302 to 304 in response to image data (AREAs 0 to 2=don't care (=0) and AREA 3=0) and the signals for selecting the address 3 of the RAM of the constant memory circuit 313 (AREAs 4 to 6=3) are written. In the area (x3, y3) to (x4, y2) where monocolor processing and undercolor processing are set together, the data for selecting the addresses 6 of the RAMs of the constant memory circuits 302 to 304 (AREAs 0 to 2=6 and AREA 3=1) and the signals for selecting the address 3 of the RAM of the constant memory circuits 313 AREAs 4 to 6=3) are written. In the other area, the data for selecting the addresses 0 to 5 of the RAMs of the constant memory circuits 302 to 304 in response to an image signal (AREAs 0 to 2=don't care and AREA 3=0) and the signals for selecting the address 0 of the RAM of the constant memory circuit 313 (AREAs 4 to 6=0) are written.

Hence, while a marked area is processed, desired constants are allowed for color conversion processing in the individual color conversion circuits 204 to 207. It is possible, therefore, to process a marked area in a monochromatic color or to provide it with an undercolor, as shown in FIG. 7B.

Figure 10:
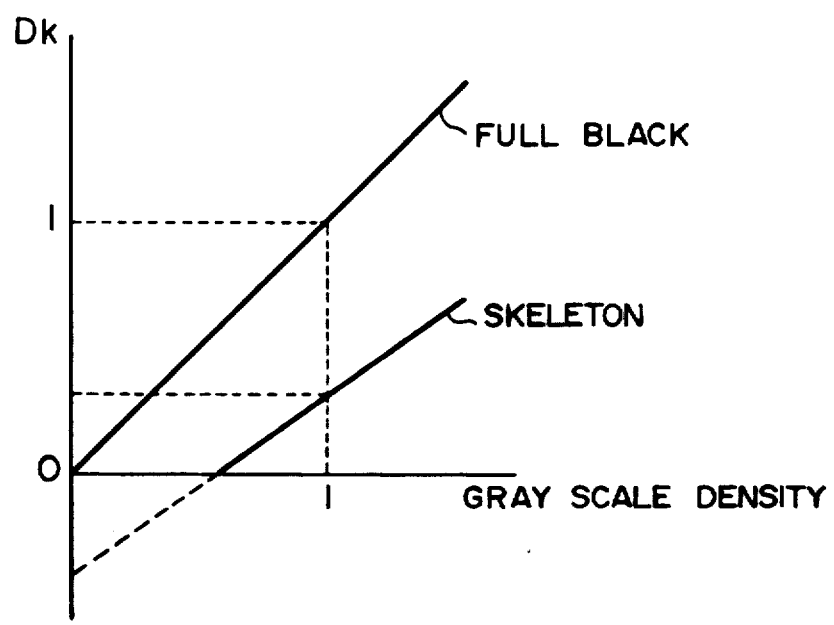
FIG. 10 is a graph showing a relationship between the gray scale density and the record density of a black coloring material available for copying the gray scale of a document.

FIG. 10 is a graph representative of a relationship between the gray scale density and the record density of a black coloring material for reproducing gray scale. When an image is recorded in skeleton black shown in FIG. 10, color conversion processing is executed as follows.

To generate a skeleton record density signal Dk by the color conversion circuit shown in FIG. 2, gray scale densities and record densities of a black recording material at two different points are selected on the lines shown in FIG. 10 and then replaced with the nonchromatic data listed in Table 2. For example, assuming that the gray scale densities are 0 and 1, and that the associated record densities Dk of a black coloring material are −0.4 and 0.3, then the specific relationship between the image densities and the record densities shown in Table 1 may be rewritten as shown below in Table 6.

TABLE 6

|  | IMAGE DENSITY | | | RECORD DENSITY | | | |
|---|---|---|---|---|---|---|---|
|  | Dr | Dg | Db | Dc | Dm | Dy | Dk |
| CHRO-MATIC | 0.302 | 1.000 | 1.000 | 0.000 | 1.387 | 1.012 | 0.000 |
|  | 0.112 | 0.112 | 1.000 | 0.054 | 0.000 | 1.401 | 0.000 |
|  | 1.000 | 0.529 | 1.000 | 1.372 | 0.000 | 1.204 | 0.000 |
|  | 1.000 | 0.510 | 0.510 | 1.345 | 0.000 | 0.546 | 0.000 |
|  | 1.000 | 1.000 | 0.408 | 1.168 | 1.215 | 0.000 | 0.000 |
|  | 0.423 | 1.000 | 0.423 | 0.228 | 1.558 | 0.000 | 0.000 |
| NON-CHRO-MATIC | 0.000 | 0.000 | 0.000 | 0.000 | 0.000 | 0.000 | −0.400 |
|  | 1.000 | 1.000 | 1.000 | 1.000 | 1.000 | 1.000 | 0.300 |

Table 7 shown below lists the constants for the above-stated color conversion processing.

TABLE 7

| COLOR SPACE | CONVERSION CONSTANTS | | | |
|---|---|---|---|---|
|  | Kcr Kmr Kyr Kkr | Kcg Kmg Kyg Kkg | Kcb Kmb Kyb Kkb | Kco Kmo Kyo Kko |
| Dr < Dg < Db | 1.434 | −0.368 | −0.066 | 0.000 |
|  | −0.555 | 1.681 | −0.126 | 0.000 |
|  | −0.018 | −0.435 | 1.452 | 0.000 |
|  | 0.430 | −0.092 | −0.362 | −0.400 |
| Dg ≦ Dr < Db | 1.856 | −0.791 | −0.066 | 0.000 |
|  | −0.998 | 2.123 | −0.126 | 0.000 |
|  | −0.018 | −0.434 | 1.452 | 0.000 |
|  | −0.299 | 0.637 | 0.362 | −0.400 |
| Dg < Db ≦ Dr | 1.704 | −0.791 | 0.087 | 0.000 |
|  | −1.039 | 2.123 | −0.084 | 0.000 |
|  | 0.073 | −0.434 | 1.361 | 0.000 |
|  | 0.088 | 0.637 | −0.025 | −0.400 |
| Db ≦ Dg ≦ Dr | 1.704 | −0.421 | −0.283 | 0.000 |
|  | −1.039 | 2.402 | −0.363 | 0.000 |
|  | 0.073 | −0.762 | 1.689 | 0.000 |
|  | 0.088 | 0.105 | 0.507 | −0.400 |
| Db ≦ Dr < Dg | 1.622 | −0.339 | −0.283 | 0.000 |
|  | −0.604 | 1.967 | −0.363 | 0.000 |
|  | 0.045 | −0.733 | 1.689 | 0.000 |
|  | 0.013 | 0.180 | 0.507 | −0.400 |
| Dr < Db ≦ Dg | 1.434 | −0.339 | −0.095 | 0.000 |
|  | −0.555 | 1.967 | −0.413 | 0.000 |
|  | −0.018 | −0.733 | 1.751 | 0.000 |
|  | 0.430 | 0.180 | 0.090 | −0.400 |

The system control unit 105 writes the constants of Table 7 to the individual constant memory circuits 303 to 304 and 313 of the color conversion circuits 204 to 207, allowing an image to be reproduced in skeleton black. The reproduction of an image in skeleton black is excellent in rendering tones and, therefore, desirable for a photographic image or similar image.

The constants shown in Table 3 are associated with the reproduction of an image in full black as shown in FIG. 10. The reproduction of an image in full black is advantageously applicable to characters because it allows black characters to be recorded by only a black coloring material.

The switchover of the coefficients shown in Tables 3 and 7 are effected by the operator by pressing, in the standard condition shown in FIG. 8B, the portion labeled "PHOTO" or "TEXT". Specifically, when the portion "PHOTO" is pressed, the system control unit 105 writes the constants of Table 7 to the memory circuits 302 to 304 and 313 of the color convesion circuits 204 to 207 while, when the portion "TEXT" is pressed, writing the constants of Table 3.

A reference will be made again to FIGS. 8A, 8B and so forth. In the condition shown in FIG. 8B, when the portion labeled "CONVERT" is pressed, a color conversion mode is set up with the result that information shown below in Table 9 appears on the screen.

| CONVERT | | | | | | | | | |
|---|---|---|---|---|---|---|---|---|---|
| DOCUMENT COLOR | WHITE | RED | YELLOW | GREEN | C | BLUE | M | BLACK | |
| | ↓ | ↓ | ↓ | ↓ | ↓ | ↓ | ↓ | ↓ | |
| RECORD COLOR | Y | R | Y | G | C | B | M | K | CANCEL |
| DENSITY | LIGHT | MEDIUM | MEDIUM | MEDIUM | MEDIUM | MEDIUM | MEDIUM | MEDIUM | END |

In the color conversion mode, various recording colors (white, red, brown, orange, yellow, yellow green, green, cyan, blue, magenta, purple, black, gray, etc.) and record different densities (light, medium and dark) are available for various document colors (white, red, yellow, green, cyan, blue, magenta, and black). Specifically, when any one of the recording color names associated with a particular document color or any one of the densities is pressed on the screen, the color name or the density level is sequentially changed to set up a desired combination.

A white area (background) of a document may be recorded in a particular color by the following procedure. When the nonchromatic color close to white shown in Table 2 is white ($Dr = Dg = Db = 0$), the color conversion circuit 207 of FIG. 2 simply replaces it with the record density of a desired color. For example, assuming that the operator desires to transform a white area to light yellow ($Dc = Dm = Dk = 0$, $Dy = 0.5$), the relationship between the image density and the record density indicated in Table 2 may be rewritten as listed in Table 10 shown below.

TABLE 10

| | IMAGE DENSITY | | | RECORD DENSITY | | | |
|---|---|---|---|---|---|---|---|
| | Dr | Dg | Db | Dc | Dm | Dy | Dk |
| CHRO- | 0.302 | 1.000 | 1.000 | −0.000 | 1.387 | 1.012 | 0.000 |
| MATIC | 0.112 | 0.112 | 1.000 | 0.054 | 0.000 | 1.401 | 0.000 |
| | 1.000 | 0.529 | 1.000 | 1.372 | −0.000 | 1.204 | 0.000 |
| | 1.000 | 0.510 | 0.510 | 1.345 | −0.000 | 0.546 | 0.000 |
| | 1.000 | 1.000 | 0.408 | 1.168 | 1.215 | 0.000 | 0.000 |
| | 0.423 | 1.000 | 0.423 | 0.228 | 1.558 | −0.000 | 0.000 |
| NON- | 0.000 | 0.000 | 0.000 | 0.000 | 0.000 | 0.500 | 0.000 |
| CHRO-MATIC | 1.000 | 1.000 | 1.000 | 1.000 | 1.000 | 1.000 | 1.000 |

In the above condition, the constants for color conversion processing will have the values indicated in Table 11 below.

TABLE 11

| | CONVERSION COEFFICIENT | | | |
|---|---|---|---|---|
| COLOR SPACE | Kcr Kmr Kyr Kkr | Kcg Kmg Kyg Kkg | Kcb Kmb Kyb Kkb | Kco Kmo Kyo Kko |
| Dr < Dg < Db | 1.434 | −0.368 | −0.066 | 0.000 |
| | −0.555 | 1.681 | −0.126 | 0.000 |
| | −0.018 | −0.435 | 1.452 | 0.500 |
| | 1.434 | −0.307 | −0.126 | 0.000 |
| Dg ≦ Dr < Db | 1.856 | −0.791 | −0.066 | 0.000 |
| | −0.998 | 2.123 | −0.126 | 0.000 |
| | −0.018 | −0.434 | 0.952 | 0.500 |
| | −0.997 | 2.123 | −0.126 | 0.000 |
| Dg < Db ≦ Dr | 1.704 | −0.791 | 0.087 | 0.000 |
| | −1.039 | 2.123 | −0.084 | 0.000 |
| | −0.427 | −0.434 | 1.361 | 0.500 |
| | −1.039 | 2.123 | −0.085 | 0.000 |
| Db ≦ Dg ≦ Dr | 1.704 | −0.421 | −0.283 | 0.000 |
| | −1.039 | 2.402 | −0.363 | 0.000 |
| | −0.427 | −0.762 | 1.689 | 0.500 |
| | −1.039 | 0.350 | 1.689 | 0.000 |

TABLE 11-continued

| | CONVERSION COEFFICIENT | | | |
|---|---|---|---|---|
| COLOR SPACE | Kcr Kmr Kyr Kkr | Kcg Kmg Kyg Kkg | Kcb Kmb Kyb Kkb | Kco Kmo Kyo Kko |
| Db ≦ Dr < Dg | 1.622 | −0.339 | −0.283 | 0.000 |
| | −0.604 | 1.967 | −0.363 | 0.000 |
| | 0.045 | 1.233 | 1.689 | 0.500 |
| | 0.044 | −0.733 | 1.689 | 0.000 |
| Dr < Db ≦ Dg | 1.434 | −0.339 | −0.095 | 0.000 |
| | −0.555 | 1.967 | −0.413 | 0.000 |
| | −0.018 | 1.233 | 1.751 | 0.500 |
| | 1.434 | −0.733 | 0.300 | 0.000 |

In summary, in accordance with the present invention, an undercolor can be added with ease by a simple and inexpensive construction while a record density signal (Dk) representative of full black or skeleton black can also be implemented by a simple and inexpensive construction. In a full-color record mode, image density signals are transformed into record density signals by constants associated with the image density signals while, in a monocolor record mode, the former is transformed into the latter by constants which are not related to the values of the image density signals. This is successful in implementing combined full-color and monocolor recording which is desirable in color reproducibility.

Various modifications will become possible for those skilled in the art after receiving the teachings of the present disclosure without departing from the scope thereof.

What is claimed is:

1. An image reproducing device for reproducing an image, the device comprising:
   an image reader for determining image densities of red, green and blue of the image;
   a color correction processing unit for determining cyan, magenta, yellow and black coloring material amounts for reproducing the image from the image densities of red, green and blue, the color correction processing unit including:
   converting means for converting the image densities of red, green, and blue of the image into equivalent non-chromatic density amounts of cyan, magenta, yellow and black coloring materials which are optimum for reproducing the image using a masking relationship:

$$Dx = Kxr^*Dr + Kxg^*Dg + Kxb^*Db + kxo$$

wherein Dx is the equivalent non-chromatic density amount of coloring materials, Kxr, Kxg and Kxb are a first group of constants, kxo represents a second group of constants, x is each of cyan, magenta, yellow and black, and Dr, Dg, and Db represent, respectively, the image densities of red, green and blue of the image;

correction means for determining corrected non-chromatic density amounts of cyan, magenta, and yellow coloring materials from the equivalent non-chromatic density amounts determined by the converting means using a correction relationship:

$$D'x = A*(Dx - Dk)/(A - Dk)$$

wherein D'x is the corrected non-chromatic density amount of the coloring materials, A is a constant of about 2 and x is each of cyan, magenta, and yellow;

a printer for reproducing the image using the corrected non-chromatic density amounts of cyan, magenta and yellow coloring materials and the equivalent non-chromatic density amount of black coloring material;

selecting means for selecting at least one of a full-color area and a monocolor area of the image;

means for selecting and providing constants K'xr, K'xg, K'xb and K'xo, for reproducing the image at the monocolor area, to the converting means wherein x is each of cyan, magenta, yellow and black; and means for selecting and providing constants Kxr, Kxg, Kxb and Kxo to the converting means for reproducing the image at the full-color area.

2. An image reproducing device according to claim 1, further comprising:

image area selecting means for selecting an area of the image to be provided with a selected undercolor;

means for selecting and providing constants K"co, K"mo, K"yo and K"ko, associated with the selected undercolor, to the converting means for providing the selected undercolor at the selected area.

3. An image reproducing device for reproducing an image, the device comprising:

an image reader for determining image densities of red, green and blue of the image;

a color correction processing unit for determining cyan, magenta, yellow and black coloring material amounts for reproducing the image from the image densities of red, green and blue, the color correction processing unit including:

converting means for converting the image densities of red, green, and blue of the image into equivalent non-chromatic density amounts of cyan, magenta, yellow and black coloring materials which are optimum for reproducing the image using a masking relationship:

$$Dx = Kxr*Dr + Kxg*Dg + Kxb*Db + kxo$$

wherein Dx is the equivalent non-chromatic density amount of coloring materials, Kxr, Kxg and Kxb are a first group of constants, kxo represents a second group of constants, x is each of cyan, magenta, yellow and black, and Dr, Dg, and Db represent, respectively, the image densities of red, green and blue of the image;

operation means for selectively designating a mode selected from an ordinary mode, and undercolor mode and skeleton mode;

a printer for reproducing the image using the corrected non-chromatic density amounts of cyan, magenta, and yellow coloring materials and the equivalent non-chromatic density amount of black coloring material;

selecting means for selecting at least one of a full-color area and a monocolor area of the image;

means for selecting and providing monocolor constants K'xr, K'xg, K'xb and K'xo, for reproducing the full-color area of the image using said masking relationship, to the converting means wherein x is each of cyan, magenta, yellow and black; and means for selecting and providing full color constants Kxr, Kxg, Kxb and Kxo to the converting means for reproducing the full-color area of the image using said masking relationship.

4. An image reproducing device according to claim 3, further comprising:

correction means for determining corrected non-chromatic density amounts of cyan, magenta, and yellow coloring materials from the equivalent non-chromatic density amounts determined by the converting means using a correction relationship:

$$D'x = A*(Dx - Dk)/(A - Dk)$$

wherein D'x is the corrected non-chromatic density amount of the coloring materials, A is a constant of about 2 and x is each of cyan, magenta, and yellow.

5. An image reproducing device for reproducing an image, the device comprising:

an image reader for determining image densities of red, green and blue of the image;

a color correction processing unit for determining cyan, magenta, yellow and black coloring material amounts for reproducing the image from the image densities of red, green and blue, the color correction processing unit including:

converting means for converting the image densities of red, green, and blue of the image into equivalent non-chromatic density amounts of cyan, magenta, yellow and black coloring materials which are optimum for reproducing the image using a masking relationship:

$$Dx = Kxr*Dr + Kxg*Dg + Kxb*Db + kxo$$

wherein Dx is the equivalent non-chromatic density amount of coloring materials, Kxr, Kxg and Kxb are a first group of constants, kxo represents a second group of constants, x is each of cyan, magenta, yellow and black, and Dr, Dg, and Db represent, respectively, the image densities of red, green and blue of the image;

operation means for selectively designating a mode selected from an ordinary mode, and undercolor mode and skeleton mode;

a printer for reproducing the image using the corrected non-chromatic density amounts of cyan, magenta, and yellow coloring materials and the equivalent non-chromatic density amount of black coloring material; and correction means for determining corrected non-chromatic density amounts of cyan, magenta, and yellow coloring materials from the equivalent non-chromatic density amounts determined by the converting means using a correction relationship:

$$D'x = A*(Dx - Dk)/(A - Dk)$$

wherein D'x is the corrected non-chromatic density amount of the coloring materials, A is a constant of about 2 and x is each of cyan, magenta, and yellow.

6. An image reproducing device according to claim 5, further comprising:

image area selecting means for selecting an area of the image to be provided with a selected undercolor;

means for selecting and providing constants K″co, K″mo, K″yo and K″ko, associated with the selected undercolor, to the converting means for providing the selected undercolor at the selected area.

7. An image reproducing device according to claim 6, further comprising:

correction means for determining corrected non-chromatic density amounts of cyan, magenta, and yellow coloring materials from the equivalent non-chromatic density amounts determined by the converting means using a correction relationship:

$$D'x = A*(Dx - Dk)/(A - Dk)$$

wherein D′x is the corrected non-chromatic density amount of the coloring materials, A is a constant of about 2 and x is each of cyan, magenta, and yellow.

* * * * *